(12) United States Patent
Larson

(10) Patent No.: US 10,383,368 B2
(45) Date of Patent: Aug. 20, 2019

(54) ATYPICAL VAPORIZING APPARATUS

(71) Applicant: Michael Raymond Larson, Aliso Viejo, CA (US)

(72) Inventor: Michael Raymond Larson, Aliso Viejo, CA (US)

(73) Assignee: Michael Raymond Larson, Aliso Viejo, CA (US)

( * ) Notice: Subject to any disclaimer, the term of this patent is extended or adjusted under 35 U.S.C. 154(b) by 223 days.

(21) Appl. No.: 15/250,707

(22) Filed: Aug. 29, 2016

(65) Prior Publication Data

US 2016/0366944 A1 Dec. 22, 2016
US 2017/0143037 A9 May 25, 2017

Related U.S. Application Data

(60) Provisional application No. 62/231,397, filed on Jul. 6, 2015.

(51) Int. Cl.
*A24F 47/00* (2006.01)
*G06F 3/0354* (2013.01)

(52) U.S. Cl.
CPC ........ *A24F 47/008* (2013.01); *G06F 3/03545* (2013.01)

(58) Field of Classification Search
None
See application file for complete search history.

(56) References Cited

U.S. PATENT DOCUMENTS

| | | | | |
|---|---|---|---|---|
| 9,351,522 B2* | 5/2016 | Safari | | A24F 47/008 |
| 9,894,934 B2* | 2/2018 | Li | | A61M 15/06 |
| 2014/0069424 A1* | 3/2014 | Poston | | A24F 47/008 128/202.21 |
| 2014/0318559 A1* | 10/2014 | Thorens | | A24F 47/008 131/329 |
| 2015/0208729 A1* | 7/2015 | Monsees | | A24F 47/008 131/329 |
| 2015/0335074 A1* | 11/2015 | Leung | | A61M 15/06 131/328 |

* cited by examiner

*Primary Examiner* — Dennis R Cordray

(57) ABSTRACT

A vaporizing apparatus includes a mouthpiece, battery and a reservoir housing an intake tube forming an air passage and vaporizing chamber proximal the battery. The vaporizing chamber also includes an inlet and vaporizing element completing an electric circuit with the battery for heating. A vapor outlet tube extends through the air passage, terminating in the vaporizing chamber adjacent the vaporizing element, and an air intake proximal the mouthpiece allows suction from the mouthpiece to urge air from the air intake through the air passage to join a vaporizable material urged through the inlet in the vaporizing chamber, vaporizing the vaporizable material with vapor exiting the mouthpiece through the vapor outlet tube.

16 Claims, 2 Drawing Sheets

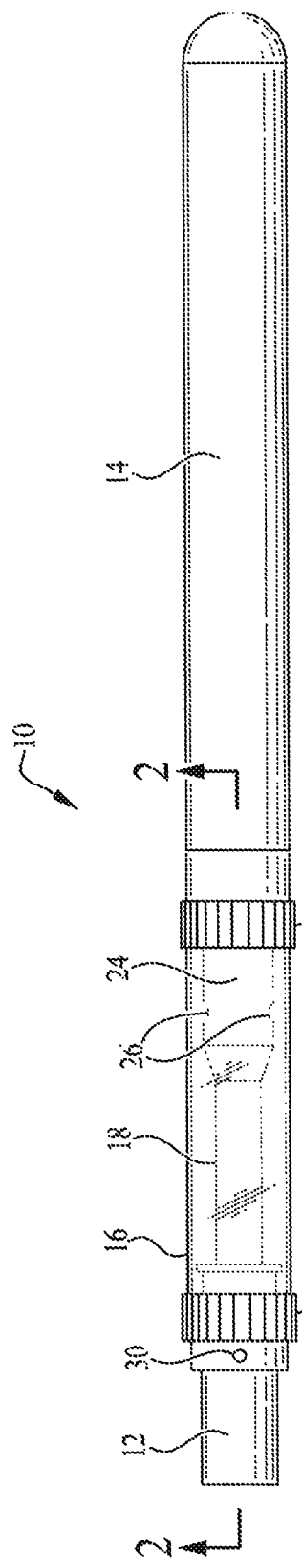
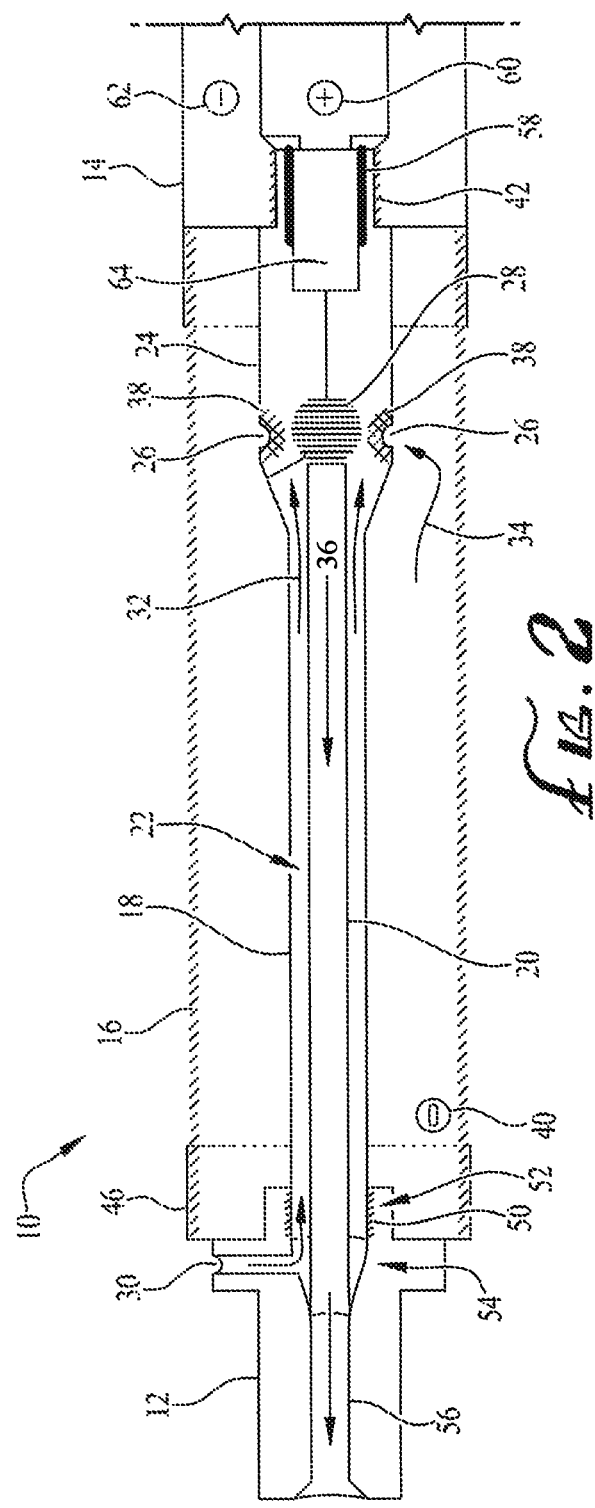

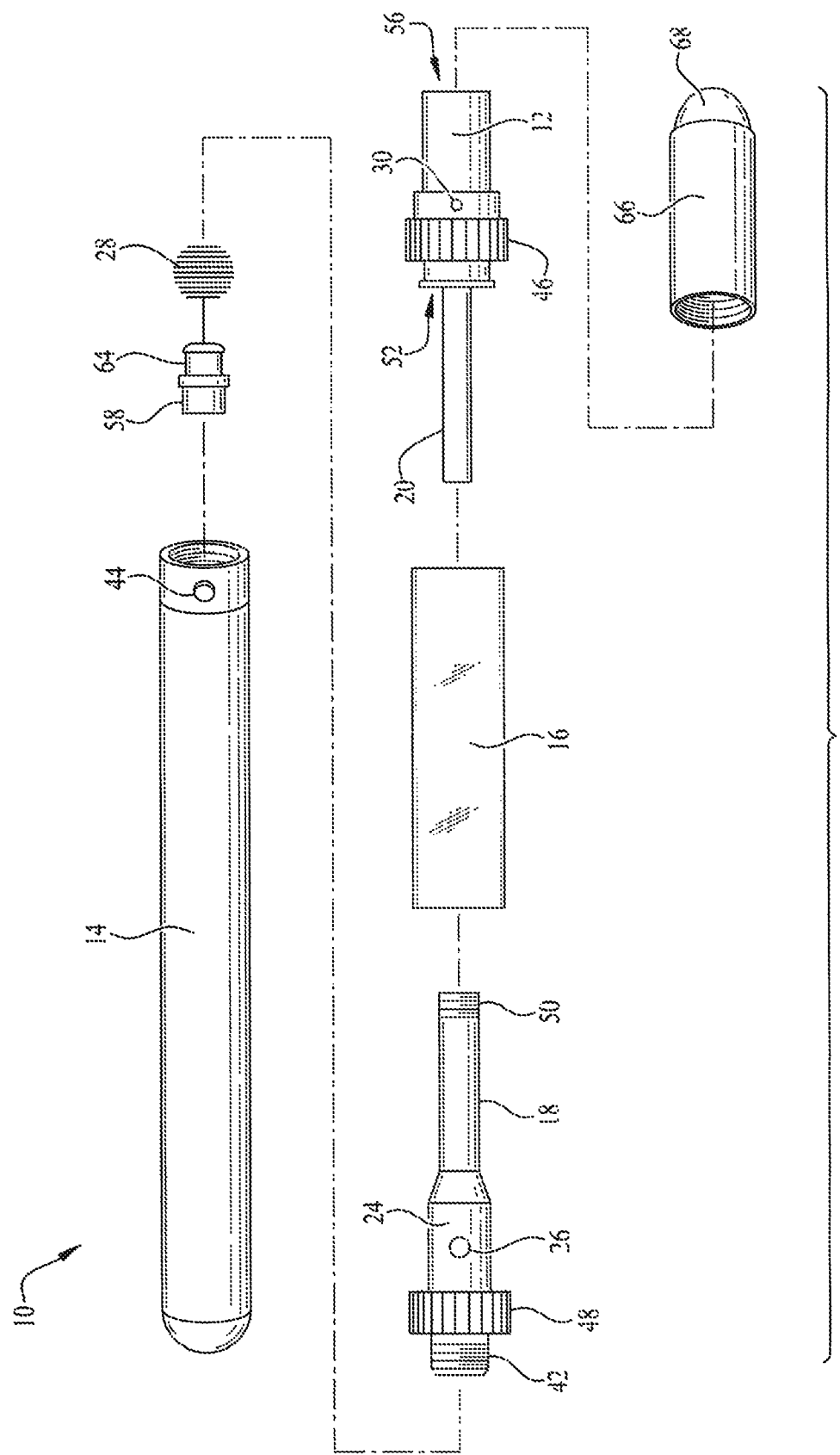

ATYPICAL VAPORIZING APPARATUS

CLAIM OF PRIORITY

This apparatus claims the benefit of the priority filing date of provisional application Ser. No. 62/231,397, filed 6 Jul. 2015, incorporated herein in its entirety, with a petition under 37 CFR 1.78(b) submitted herewith.

BACKGROUND

The apparatus generally relates to vaporization and personal vaporizers, colloquially referred to as 'e-cigarettes.' More specifically, the apparatus relates to a personal vaporizer with an atypical airflow structure for vaporizing inhalation products.

Personal portable vaporizers are known in the art. At a basic level these apparatus use power from a battery connected to a vaporizing element to heat a vaporization material to its vapor point for inhaling by a user. An on-board reservoir usually contains a sufficient quantity of vaporization material for several repeated vaporization events. Personal vaporizers were designed as an alternative to cigarettes and similar products that are combusted prior to inhalation, since vaporizing products designed for inhalation are thought to avoid generating harmful combustion byproducts.

Conventional vaporizers have a significant drawback in that the vaporizing element is typically a thin wire filament wound helically around a 'wick' of porous material. The vaporization material, normally oil-based, soaks the wick, and once the vaporizing element sufficiently heats the wick, the material vaporizes, with the vapor inhaled by the user. Usually, the wick material used is synthetic, including silica thread (aka sodium silicate). When overheated, this material has a tendency to burn, releasing harmful byproducts, such as silica fragments that cause damage to a user's lungs and other ill health effects.

Conventional vaporizers also have the drawback of sequestering ambient air from adjacent the battery, which can cause damage when residue of the vaporizing material exits an air port near the battery and corrodes the terminals. Since vaporizers are typically carried 'mouth-up', any residual vaporizing material has a tendency to move under gravitational forces toward and out of the air port, leading to hastened damage and malfunctioning of the vaporizer.

Hence, what is needed is a personal vaporizer that provides for vaporization without requiring a wick, and which provides an atypical pathway for air and vaporization residue not prone to leakage.

SUMMARY

A vaporizing apparatus includes a mouthpiece and a battery as well as a reservoir housing an intake tube and a vapor outlet tube. The intake tube includes an air passage 22 and a vaporizing chamber proximal the battery. The vaporizing chamber includes at least one inlet and a vaporizing element. The vaporizing element completes an electric circuit with the battery for heating. The vapor outlet tube extends through the air passage 22, terminating in the vaporizing chamber adjacent the vaporizing element. An air intake proximal the mouthpiece allows suction from the mouthpiece to urge air from the air intake through the air passage 22 to join a vaporizable material urged through the inlets in the vaporizing chamber. Thereafter the vaporizing element vaporizes the vaporizable material, and the vapor exits the mouthpiece through the vapor outlet tube.

The apparatus may include a semi-permeable barrier between the inlets and the vaporizing chamber to prevent leakage. Optionally, the air intake may be formed in the mouthpiece and the reservoir may include a refilling port. Preferably the vaporizing element is grounded to the vaporizing chamber, and the vaporizing element is optionally also grounded to the vapor outlet tube. A threaded connection may be provided between the reservoir and the battery, with an insulator placed between the vaporizing element and a threaded connection to the battery to prevent shorting. A manually operated circuit control may also be provided for completing the circuit between the vaporizing element and the battery.

In an alternative embodiment, a vaporizing apparatus has a mouthpiece and a battery and a reservoir radially centered around an intake tube. The intake tube is radially centered around a vapor outlet tube and forms an air passage therebetween. The air intake is preferably proximal the mouthpiece and in open communication with the intake tube, with the intake tube comprising an enlarged vaporizing chamber opposite from the air intake, such that air entering the air intake reaches the enlarged vaporizing chamber through the intake tube.

In such a configuration, the vaporizing chamber includes one or more inlets in open communication with the reservoir, and a vaporizing element completes an electric circuit with the battery. The vaporizing element also extends across the vaporizing chamber, with the vapor outlet tube extending from the mouthpiece and terminating in the vaporizing chamber adjacent the vaporizing element, such that suction at the mouthpiece urges air from the air intake through the air passage to join a vaporizable material urged through the inlets in the vaporizing chamber, and the vaporizing element vaporizes the vaporizable material, thereby allowing vapor to exit the mouthpiece through the vapor outlet tube.

As with the first embodiment, a semi-permeable barrier may be placed between the inlets and the vaporizing chamber, with the air intake formed in the mouthpiece. The reservoir may include a refilling port. The vaporizing element is preferably grounded to the vaporizing chamber and optionally to the vapor outlet tube. A threaded connection may be provided between the reservoir and the battery, with an insulator between the vaporizing element and a threaded connection to the battery. A manually operated circuit control may be provided for completing the circuit between the vaporizing element and the battery.

In a third embodiment, a vaporizing apparatus includes a reservoir radially centered around an intake tube. The intake tube is radially centered around a vapor outlet tube and forms an air passage there between. The air intake is proximal a mouthpiece and in communication with the intake tube, the intake tube terminating in a vaporizing chamber opposite from the air intake, such that air entering the air intake reaches the enlarged vaporizing chamber through the intake tube.

The vaporizing chamber has at least one inlet adjacent the reservoir and a vaporizing element interruptably completing an electric circuit with the battery, with the vapor outlet tube extending between the mouthpiece and the vaporizing chamber, and terminating adjacent the vaporizing element. In this manner, mouthpiece suction urges air through the air intake and the air passage to join a vaporizable material urged through at least one inlet in the vaporizing chamber and continued mouthpiece suction urges vapor generated by the vaporizing element vaporizing the vaporizable material through the vapor outlet tube to the mouthpiece. Preferably the vaporizing apparatus includes an interrruptable circuit for powering the vaporizing element with the battery.

BRIEF DESCRIPTION OF THE FIGURES

FIG. 1 illustrates a side view of a vaporizing apparatus having an atypical air and vapor flow circuit;

FIG. 2 illustrates a cross sectional view of the vaporizing apparatus; and

FIG. 3 illustrates an exploded view of the vaporizing apparatus.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIG. 1, a vaporizing apparatus 10 is shown. The apparatus 10 is similar to a conventional disposable or reusable e-cigarette-type vaporizer in that it has a mouthpiece 12 through which a user draws vapor 36 (FIG. 2), a battery portion 14 housing a battery for powering the apparatus 10 and reservoir 16 for holding a vaporizable material 34 (i.e., 'product'; FIG. 2) to be vaporized. The vaporizable material 34 is typically an oil-based liquid preparation containing nicotine or other compounds normally consumed through combustion inhalation (i.e., 'smoking'); vaporization being a preferred liquid/solid-to-gas phase process that avoids generating combustion byproducts.

A numbered list of each element has been provided herein to aid with the drawings.
2) Cartridge
10) Vaporizing Apparatus
12) Mouthpiece
14) Battery Only
16) Reservoir
18) Air intake tube
20) Vapor Outlet Tube
22) Air Passage
24) Vaporizing Chamber
26) Inlet(s)
28) Vaporizing Element
30) Air Intake
32) Transit of Air
34) Vaporizable Material
36) Vapor
38) Semi-permeable barrier
40) Refilling port
42) Threaded Connection to Battery
44) Circuit control
46) Mouthpiece end cap
48) Base end cap
50) Threaded end of intake tube
52) Receiving bore
54) Diameter
56) Vapor Bore
58) Insulator Support
60) Positive terminal
62) Negative terminal
64) Filament support
66) Mouthpiece Cover
68) Tip capacitive material Preferably, the reservoir 16 is entirely or partially made of glass or a similar clear material, thus allowing a user to view the contents of the reservoir 16 and ascertain the level of product therein, in particular, allowing a user to know when the vaporizable material 34 is entirely consumed. To help a user quantify the amount of vaporizable material 34 remaining in the reservoir 16, grading may be inscribed on or applied to the reservoir 16. Additionally, providing a clear (or partially clear) reservoir 16 makes the apparatus 10 more aesthetically pleasing since vaporizable material 34 used in the apparatus 10 is frequently doctored with colorants tailored to a specific flavor of oil (and consequently, vapor 36).

Since the vaporizable material 34, although color tinted, is normally otherwise clear, other components of the apparatus 10 are visible inside the reservoir 16. An intake tube 18 travels the length of the reservoir 16. At the base of the intake tube 18 a vaporizing chamber 24 is provided, and one or more inlets 26 are provided thereon, through which the vaporizable material 34 travels into the vaporizing chamber 24 to be vaporized. To provide an effective, inexpensive, and easy to manufacture apparatus 10, the reservoir 16 may comprise a mouthpiece cap 46 and a base end cap 48, with the middle portion being clear cylindrical glass as illustrated.

It should be understood that while the illustrated embodiment includes a reservoir 16 with mouthpiece cap 46 and base end cap 48, other preferred embodiments may comprise an entirely glass reservoir 16, and may be of any shape, or use any other material, suitable for securely holding vaporizable material 34 while providing access to the vaporizing chamber 24. Additionally, the reservoir 16 may be sealed, making the apparatus 10 single-use and disposable, or may be capable of disassembly or have an opening or other access structure permitting refilling, thus making the apparatus 10 reusable.

Referring to FIG. 2, structural details of the apparatus 10 reflecting its atypical gas flow operation are shown during vaporization (i.e., in use). With the apparatus 10 activated such that the battery 14 completes a circuit, and a user providing suction at the mouthpiece 12, air 32 is drawn into the air intake 30. The air intake 30 may be formed directly into the mouthpiece 12 as illustrated, or may be adjacent the mouthpiece 12, or may be disposed at another location proximal the mouthpiece 12. From the air intake 30, the air 32 enters an area of reducing diameter 54 and travels into the intake tube 18, passing through the intake tube 18 toward the vaporizing chamber 24.

Inside the air intake tube 18 is a vapor outlet tube 20. The vapor outlet tube 20 has an outer diameter smaller than the air intake tube's 18 inner diameter, thereby creating a space around the outlet tube 20 through which the air 32 travels. The vapor outlet tube 20 extends through the intake tube 18 from the vaporizing chamber 24, through the area of reducing diameter 54, and engages a vapor bore 56 in the mouthpiece 12 to create a hermetic seal. Hermetic engagement between the vapor bore 56 and the vapor outlet tube 20 prevents any air 32 entering the air intake 30 from escaping the apparatus 10 directly through the vapor bore 56.

Although the vapor bore 56 and vapor outlet tube 20 are shown as separate structures in the illustrated embodiment, and the contact between them shown as a conventional pressure fit, any other design conferring hermetic sealing between the two, including using a threaded or unitary construction, is contemplated. Additionally, the area of reducing diameter 54 may be of any shape or configuration as long as it permits air 32 from the air intake 30 to reach and travel through the intake tube 18 to the vaporizing chamber 24 without allowing the air 32 to escape directly through the vapor bore 56 or mouthpiece 12. For ease of assembly, the intake tube 18 may include a threaded end 50 for resiliently engaging the mouthpiece 12. Also, on the opposite end of the intake tube 18 may be a threaded end engaging the vaporizing chamber 24 (not shown).

As a user creates suction at the mouthpiece 12, the air intake 30, due to a small aperture size or other constriction, creates a pressure differential that lowers pressure in the vaporizing chamber 24 relative to the reservoir 16. That pressure differential urges some of the vaporizable material 34 to travel through the inlets 26 into the vaporizing chamber 24, where it mingles with the air 32. As the vaporizable material 34 enter the vaporization chamber 24, it also coats the vaporizing element 28 therein.

Supporting the generation of vapor 36, the battery portion 14 includes a positive terminal 60 in broad contact with a filament support 64. The filament support 64 supports the vaporizing element 28 in the vaporizing chamber 24. The vaporizing element 28 is also connected to either the intake tube 18, vapor outlet tube 20 or the vaporizing chamber 24 as illustrated. All three structures are preferably in electrically conducting contact, and also in electrically conducting contact with the negative (ground) area 62 of the battery portion 14, thereby completing an electrical circuit. To prevent shorting, an insulator 58 is provided to separate the filament support 64 from the vaporizing chamber 24.

Although in the illustrated example the intake tube 18, vapor outlet tube 20 and vaporizing chamber 24 are in conducting contact, and the vaporizing element 28 shown contacting the vaporizing chamber 24, any arrangement whereby the vaporizing element 28 makes electrical contact with the negative (ground) area 62, thus completing a circuit of the battery portion 14, is contemplated. Also, in the illustrated embodiment, a threaded connection 42 is shown between the vaporizing chamber 24 and the negative (ground) area 62 of the battery portion 14. Although this is typical of conventional (disposable and refillable) vaporizers, any suitable contact for the battery portion 14 making positive contact with the filament support 64 and negative contact leading to the vaporizing element 28 is contemplated.

The vaporizing element 28 is typically made of fine wire, thus being electrically resistive and causing it to generate heat when electrical charge is applied. By arranging the fine wire in a condensed helical structure, the vaporizing element 28 also concentrates this heat at the helix. Although a helical arrangement of fine wire is contemplated, any vaporizing element 28 achieving sufficient vaporization heat when an electrical current is applied is contemplated. With the user having activated the apparatus 10 to complete the circuit with the battery portion 14 and applied suction at the mouthpiece 12, the vaporizing material 34 enters the inlets 26 and coats the vaporizing element 28, which heats up to a predetermined temperature suitable for vaporizing the vaporizing material 34.

Since the air 32 also occupies the vaporizing chamber 24, it allows the vaporizing material 34 to substantially vaporize (as opposed to simply boiling inside the vaporizing chamber 24) and acts as a carrier, sweeping the vapor 36 from the vaporizing chamber 24 into the vapor outlet tube 20. The vapor 36 travels through the vapor outlet tube 20, through the vapor bore 56 and out the mouthpiece 12 to be inhaled by the user. Importantly, since the vaporizing chamber 24 contains only the vaporizing material 34 and air 32, as opposed to other materials such as cotton, synthetic string, etc., normally found in vaporizers, the user receives no by-products from these materials.

Once the user receives a desired quantity of vapor 36, the circuit deactivates and the user withdraws suction at the mouthpiece 12, thus ceasing vaporization and the transit of air 32, vaporizable material 34 and vapor 36 through the apparatus 10. By breaking the battery portion 14 circuit prior to withdrawing suction, a sufficient quantity of vaporizable material 34 remains in the vaporization chamber 24 for the next vaporization event.

Under the pressure differential caused by suction at the mouthpiece 12, a portion of the vaporizable material 34 is drawn into vaporizing chamber 24. This action causes a corresponding pressure differential in the reservoir 16, essentially creating an increasing vacuum as vaporizing material 34 leaves the reservoir 16. After a vaporization event is over, and suction withdrawn, the vacuum in the reservoir 16 draws air 32 back through the vapor outlet tube 20 from the mouthpiece 12 (and, partially, through the intake tube 18 from the air intake 30 to travel through the inlets 26 and into the reservoir 16. This equalizes the air pressure in the reservoir 16 to be substantially the same (i.e., atmospheric) pressure as the ambient air 32 surrounding the apparatus 10. Optionally, for refilling, the reservoir 16 may be fitted with a resealing refilling port 40, allowing a user to refill the reservoir 16 with vaporizable material 34 as desired.

Since the inlets 26, in connection with the mouthpiece 12 and air intake 30, allow open communication with the reservoir 16, there is a risk of leakage. To prevent the vaporizing material 34 from unintentionally traveling out of the reservoir 16, a semi-permeable barrier 38 is preferably provided at each inlet 26. The semi-permeable barrier 38 permits gas exchange, while retarding the transit of the vaporizable material 34 unless drawn through under pressure. Due to the viscosity of the vaporizable material 34 (typically being oil-based) and the equal-to-negative pressure differential between the reservoir 16 and ambient environment of the apparatus 10, the semi-permeable barriers 38 are sufficient for preventing the vaporizable material 34 from 'leaking' through the inlets 26 when the apparatus 10 is not in use. Although any semi-permeable barrier 38 can be used, some exemplary materials include foam, such as open-cell foam, organic materials such as cotton, or other suitable materials now known or hereinafter devised. Thus the apparatus 10 can be a micronic infiltrating (in the sense that the space through which the vaporizing material 34 travels is measured in microns) atypical vaporizing delivery system.

Referring to FIG. 3, an exploded view of the apparatus 10 is shown. The major structure of the apparatus 10 is the battery portion 14 which is preferably sized to provide charge for vaporizing the entire contents of the reservoir 16. The battery portion 14 may include a manually operated circuit control 44, which is typical of older vaporizers. Alternatively, it may have an internal apparatus (not shown) for completing the vaporizing circuit upon a user applying suction at the mouthpiece 12. Additionally the battery portion 14 may have circuitry dedicated to controlling electrical current, thus providing for a particular vaporization temperature, multiple vaporization temperatures, or a stepped heating profile, wherein the temperature rises to a first level and pauses, prior to rising to a second, third and fourth level with similar pauses in between, optionally controlled by a user. An integrated circuit with programming connectivity (such as, for example, a micro-USB controller) may be provided for programming an onboard microchip (not shown) by computer.

The positive terminal 60 of the battery portion 14 is typically surrounded by the negative (ground) area 62, spaced apart at the positive terminal 60 for accommodating the filament support 64 without shorting. As discussed, the filament support 64, containing the vaporizing element 28 and surrounded by the insulator 58, may be inserted into the vaporization chamber 24, with the threaded connection 42 providing secure electrical connection to the battery portion 14. The area of the apparatus 10 comprising the reservoir 16 (with optional mouthpiece end cap 46 and base end cap 48), and containing the intake tube 18 (and vapor outlet tube 20), vaporizing chamber 24 with its inlets 26 and housing the vaporizing element 28, is typically referred to as a single unit, termed an 'atomizer,' 'clearomizer,' or 'cartomizer.' The illustrated embodiment depicts a clearomizer since the entire quantity of vaporizable material 34 in the reservoir 16 is visible. For ease of assembling the 'clearomizer' portion of the apparatus 10, the mouthpiece 12 may include a receiving bore 52 for receiving the threaded end 50 of the intake tube 18.

In various embodiments, the apparatus 10 may be made as a completely disposable unit with a permanently attached battery portion 14 and clearomizer (atomizer, cartomizer, etc.) Alternatively, as illustrated, it may be made with a detachable rechargeable battery portion 14, and may be made with an optional refilling port 40 either on the reservoir 16 as illustrated, or otherwise in fluid communication with the reservoir 16. To provide for planned obsolescence or replacement after a given period of time, a vaporizing element 28 may be used that degrades over a specific period of time. Other contemplated embodiments include a so-called 'inclusive' design having a recharging onboard battery portion 14 with a refilling cartomizer design, and a 'hybrid unit' having a combination of a disposable (i.e., permanently sealed) and reusable (i.e., openable) parts.

Also shown in FIG. 3, a mouthpiece cover 66 may be provided for covering the mouthpiece 12, thus preventing the intrusion of debris therein. The cover 66 may be in a threaded or pressure fit arrangement, or removably connected in any other manner allowing it to be easily removed, yet remain in place while the apparatus 10 is not in use. In one embodiment the mouthpiece cover 66 may include a tip of capacitive material 68 for activating and operating capacitive touch screens on electronic devices (not shown), effectively transforming the apparatus 10 into a functioning stylus when not in use for vaporizing.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

I claim:

1. A vaporizing apparatus having a mouthpiece and a battery, the apparatus comprising:
    a reservoir housing;
    an intake tube comprising an air passage;
    a vaporizing chamber, wherein the intake tube opens into the vaporizing chamber, wherein the reservoir housing extends radially around the intake tube and the vaporizing chamber;
    an inlet disposed between the reservoir and the vaporizing chamber, such that the reservoir is in open communication with the vaporizing chamber;
    a semipermeable barrier disposed between the inlet and the vaporizing chamber;
    a vaporizing element in the vaporizing chamber, the vaporizing element interruptably completing an electric circuit with the battery;
    a vapor outlet tube extending through the air passage and terminating in the vaporizing chamber adjacent the vaporizing element;
    an air intake proximal to the mouthpiece, wherein suction at the mouthpiece urges air from the air intake through the air passage to join a vaporizable material urged through the inlet and into the vaporizing chamber, and wherein the vaporizing element vaporizes the vaporizable material, thereby allowing vapor to exit the mouthpiece through the vapor outlet tube.

2. The apparatus of claim 1, wherein the air intake is formed in the mouthpiece.

3. The apparatus of claim 1, wherein the reservoir further comprises a refilling port.

4. The apparatus of claim 1, wherein the vaporizing element is grounded to the vaporizing chamber.

5. The apparatus of claim 1, wherein the vaporizing element is grounded to the vapor outlet tube.

6. The apparatus of claim 1, further comprising a threaded connection between the reservoir and the battery.

7. The apparatus of claim 1, further comprising an insulator between the vaporizing element and a threaded connection to the battery.

8. The apparatus of claim 1, further comprising a manually operated circuit control for completing the circuit between the vaporizing element and the battery.

9. A vaporizing apparatus having a mouthpiece and a battery, the apparatus comprising:
    a reservoir radially centered around an intake tube, the intake tube radially centered around a vapor outlet tube;
    an air intake in open communication with the intake tube;
    an enlarged vaporizing chamber disposed at a distal end of the intake tube, such that air entering the air intake reaches the enlarged vaporizing chamber through the intake tube;
    an inlet disposed between the reservoir and the vaporizing chamber, such that the reservoir is in open communication with the vaporizing chamber;
    a semipermeable barrier disposed between the inlet and the vaporizing chamber;
    a vaporizing element interruptably forming an electric circuit with the battery, the vaporizing element extending across the vaporizing chamber, wherein the vapor outlet tube extends from the mouthpiece and terminates in the vaporizing chamber, adjacent the vaporizing element, wherein suction at the mouthpiece urges air from the air intake through the intake tube to join a vaporizable material urged through the inlet and into the vaporizing chamber, and wherein the vaporizing element vaporizes the vaporizable material, thereby allowing a vapor to exit the mouthpiece through the vapor outlet tube.

10. The apparatus of claim 9, wherein the air intake is formed in the mouthpiece.

11. The apparatus of claim 9, wherein the reservoir further comprises a refilling port.

12. The apparatus of claim 9, wherein the vaporizing element is grounded to the vaporizing chamber.

13. The apparatus of claim 9, wherein the vaporizing element is grounded to the vapor outlet tube.

14. The apparatus of claim 9, further comprising a threaded connection between the reservoir and the battery.

15. The apparatus of claim 9, further comprising an insulator between the vaporizing element and a threaded connection to the battery.

16. The apparatus of claim 9, further comprising a manually operated circuit control for completing the circuit between the vaporizing element and the battery.

\* \* \* \* \*